United States Patent Office

3,189,619
Patented June 15, 1965

3,189,619
SYNTHESIS OF CAPROLACTONE
Clyde Lee Aldridge and James Bryan Zachry, Baton Rouge, La., assignors to Esso Research and Engineering Company, a corporation of Delaware
No Drawing. Filed Sept. 25, 1962, Ser. No. 226,151
6 Claims. (Cl. 260—343)

The present invention pertains to the preparation of monocyclic lactones and particularly ω-caprolactone per se.

The preparation of seven-membered lactones is not easily accomplished and at the present time such lactones are not readily available in the chemical market. One means of preparing caprolactone is by the peroxidation of cyclohexanone. However, the starting materials are currently very costly. U.S. Patent 2,443,451 to Grigsby describes the preparation of epsilon-caprolactone by bubbling ketene gas through tetrahydrofurane containing an acid catalyst at temperatures below 100° C. However, relatively low yields are obtained in this manner. The literature describes the conversion of hydroxy acids and esters to lactones. However, the preparation of seven-membered lactones in good yield is not described. When these procedures are applied to ω-hydroxy caproic acid esters for the removal of alcohol by distillation, etc. the lactone is not obtained but rather polymerization occurs. Polymerization predominates even when the conversion to lactone is attempted in dilute solutions. Carothers is apparently the only one who has obtained any appreciable yield (63%) of caprolactone from ω-hydroxy caproic acid and his technique for removing acetic acid from acetylated ω-hydroxy caproic acid at −80° C. and under high vacuum for a four-day period is not practical. Finally, it is proposed in U.S. Patent 2,652,406 to prepare lactones having more than 12 chain members in the lactone ring by cyclizing a diester having a chain of from about ten to fifteen carbon atoms separating the ester groups in the presence of a catalyst for the exchange of radicals. As catalysts, this patent recommends the alkaline or earth alkaline derivatives of mono-or polyvalent alcohols, or phenols; and more or less ionized bodies with an acid reaction such as sulfuric or phosphoric acid, organic acids, aryl sulfonic acids, etc. These higher lactones do not have the practical value of caprolactone per se which is required for the synthesis of ω-amino heptanoic acid (Nylon-7 monomer). Other possible uses include the conversion of caprolactone to caprolactam and the synthesis of polyester compounds therefrom.

It is the object of this invention to provide a novel and efficient method for the preparation of caprolactone.

It is also the object of this invention to prepare caprolactone in good yields and purity in a simple and effective manner. These and other objects will appear more clearly from the detailed specification and claims which follow.

It has now been found that the alkyl ω-hydroxy caproates may be converted to caprolactone by reacting said hydroxy caproates with trimethyl or triethyl borate to form the corresponding borate esters and thereupon pyrolyzing the borate esters to yield caprolactone and reforming the trimethyl or triethyl borate. This preparation may be illustrated by the equations

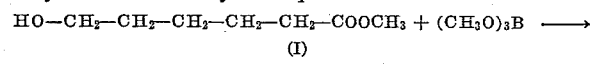

(I)

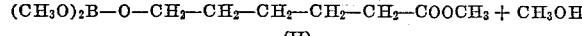

(II)

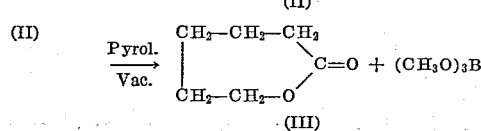

(III)

While the above equations utilize the methyl ester, ethyl and propyl esters can also be used although the latter are less desirable because $C_3$ (and higher) borate esters boil in the range of caprolactone and thus give rise to problems in the separation of the caprolactone from the reformed borate. For process reasons it is desirable to use trimethyl borate with methyl ω-hydroxy caproate and triethyl borate with ethyl ω-hydroxy caproate.

The alkyl ω-hydroxy caproates serving as the starting material for the caprolactone synthesis in accordance with the present invention can be readily prepared in the following way. A reaction mixture comprising butadiene-1,3, methyl or ethyl alcohol and carbon monoxide with a catalyst comprising rhodium, e.g. rhodium oxide at moderately elevated pressures forming a mixture of esters of unsaturated $C_5$ acids, principally esters of the formula $CH_2=CH-CH_2-CH_2-COOR$, wherein R is methyl or ethyl. The unsaturated ester products obtained in this way may be readily converted via the Oxo reaction to aldehydic esters containing one carbon atom more than the unsaturated ester feed. The aldehydic esters produced in this way can be converted by hydrogenation as well known in the art to the corresponding hydroxy esters.

Various forms of rhodium are suitable as catalysts for the carbonylation reaction. For example, the metal per se or inorganic compounds thereof such as the oxide, halides, nitrate, sulfate or organic compounds thereof such as the carbonyl, the rhodium salts of $C_1$ to $C_{20}$ carboxylic acids such as acetic, propionic, butanoic, hexanoic, maleic, linoleic and stearic acids, or the salts of $C_1$ to $C_{20}$ alcohols. Of all these rhodium oxide, e.g. the dioxide or sesquioxide, is the preferred catalyst. Also rhodium or its compounds may be employed in combination with any of the conventional catalyst carriers such as activated carbon, silica, alumina, silica-alumina, kieselguhr and the like. In such supported catalysts, the proportion of rhodium compound to carrier is not critical. However, for practical considerations, the rhodium content will ordinarily comprise from about 1 to 40 wt. percent, based on carrier, with about 3 to 10 wt. percent being preferred. The amount of catalyst employed comprises any amount sufficient to effectively catalyze the desired carbonylation reaction. Generally, from 0.001 to 5 wt. percent calculated as rhodium metal, on diolefin feed is suitable with amounts varying from 0.01 to 1.0 wt. percent being preferred.

In the preparation of the unsaturated esters of the formula $CH_2=CH-CH_2-CH_2-COOR$, butadiene-1,3, is carbonylated in the presence of carbon monoxide and a $C_1-C_3$ alkanol, preferably methanol. Theoretically, the alkanol and butadiene need be present in equimolar amounts. It is preferable, however, that the alkanol be present in amounts stoichiometrically exceeding the amount of conjugated diolefin. While the excess over stoichiometric is not critical, it has been found that by having the alkanol present in quantities sufficient to serve both as a reactant and a diluent, e.g. preferably greater than 2 moles/mole of butadiene, the desired reaction proceeds more smoothly and less difficulties are experienced from side reactions such as polymerization. Alternatively, at least part of the diluent function of the alkanol or coreactant may be served by using other solvents which are inert under the process conditions, e.g. inert oxygenated solvents, hydrocarbons, and the like.

While not absolutely essential, trace amounts of certain substances may be used which have a pronounced effect in promoting the desired reaction. Generally, the promoters comprise organic carboxylic acids and organic nitrogen bases or combinations thereof. More particularly, the promoters comprise compounds selected from the group consisting of the lower ($C_1$ to $C_7$) carboxylic acids, the lower ($C_1$ to $C_7$) alkyl amines, aromatic amines, and heterocyclic nitrogen bases, e.g. acetic acid, n-butylamine, aniline and pyridine. In those process systems in which water is not present, inadvertently or otherwise, the addition of water thereto is also effective in promoting the desired reaction. The amount of promoter added is, in general, approximately equivalent to the quantity of catalysts. Amounts exceeding this quantity may be used, but little additional advantage results therefrom. Routine experimentation will readily establish the optimum amount of promoter in each case.

In order to bring about the desired carbonylation reaction, it is necessary to provide superatmospheric pressures of carbon monoxide. Preferably the carbon monoxide should be substantially free of hydrogen so as to avoid losses of butadiene or the unsaturated ester product through hydrogenation and/or other side reactions. Carbon monoxide streams containing small amounts of hydrogen can be used in those instances in which the cost of removing hydrogen from the carbon monoxide exceeds the economic losses due to hydrogenation and/or other side reactions. It is also desirable, in order to obtain maximum catalyst efficiency, to use a carbon monoxide stream which is free of catalyst poisons such as iron carbonyl. The removal of such poisons is readily accomplished by passing the stream under pressure through a bed of solid adsorbent such as molecular sieves.

Stoichiometrically, one mole of carbon monoxide is required for each mole of butadiene processed. In practice, 50 to 150% and even higher excesses of carbon monoxide over the theoretical amount are provided. Carbon monoxide partial pressure is not critical as long as superatmospheric pressures are used. Carbon monoxide pressures of between 250 and 5000 p.s.i.g. have been found to be satisfactory with carbon monoxide partial pressures between 500 and 3000 p.s.i.g. preferred from the viewpoint of adequate reaction rates as well as reasonable equipment costs. The temperature of the carbonylation reaction may also vary considerably, e.g. from 50° to 300° C. with temperatures between 125° and 225° C. preferred since within this range, the rate of reaction is rapid and losses to side reactions are minimized.

The carbonylation of the butadiene is generally carried out by heating the reaction mixture comprising the conjugated diolefin or butadiene, the alkanol, carbon monoxide and, when employed, the promoter in a suitable pressure vessel and in contact with the rhodium-comprising catalyst. While this reaction can be carried out in autoclaves constructed of iron-containing materials, iron carbonyl is detrimental to the reaction and it is therefore preferred to use vessels constructed or lined with inert materials, e.g. silver. An improvement in conversion to the unsaturated ester product is also obtained if the diolefin is introduced into the reaction vessel in increments over a period of time rather than all at once.

The unsaturated ester products produced as described above are readily converted in a subsequent step via the Oxo reaction to aldehydic esters containing one carbon atom more than the unsaturated ester feed. Conventional oxonation conditions including temperatures varying from 75° to 200° C. and synthesis gas pressures between 500 and 5000 p.s.i.g. are suitable, preferably at about 100° C., about 1200 p.s.i.g. and in contact with a preformed cobalt carbonyl catalyst in concentrations varying from 0.1 to 1.0 wt. percent cobalt based on feed. The aldehydic esters produced in this way can be converted by means well known in the art to the corresponding alkyl ω-hydroxy caproates, e.g. by hydrogenation in contact with known hydrogenation catalysts such as nickel, copper chromiate or sulfur-resistant catalysts such as tungsten, nickel or molybdenum sulfide, preferably supported on carriers such as adsorptive alumina, pumice, charcoal or the like under conventional conditions such as pressures of 2500 to 4500 p.s.i.g., temperatures in the range of 300 to 600° F., feed rates in the range of 0.1 to 5.0 volumes of feed per volume of catalyst per hour and hydrogen rates of 5000 to 20,000 standard cubic feet per barrel of feed.

In a specific embodiment, butadiene is carbonylated by charging a one-liter stirred autoclave with 1.5 g. of rhodium oxide ($Rh_2O_3$), a trace of water, i.e. 0.3 g. (approximately molecularly equivalent to the amount of catalyst), and 400 mls. of reagent grade methanol. The autoclave is heated to about 150° C. and pressurized to about 900 p.s.i.g. with carbon monoxide which previously had been passed under pressure through a bed of molecular sieves. Then 67.5 g. of high purity grade butadiene is pumped into the reactor over a period of two hours. The reaction is allowed to continue for an additional three hours while maintaining a total pressure of about 900–1050 p.s.i.g. by the addition of carbon monoxide as necessary. After the autoclave cools, the liquid product is removed and the unsaturated ester product isolated by distilling off unconverted butadiene and methanol. The unsaturated ester product, methyl pentenoate, is oxonated at a temperature of about 120° C. and 1200 p.s.i.g. synthesis gas pressure (1/1 molar ratio of hydrogen to carbon monoxide) in the presence of preformed cobalt carbonyl catalyst to form methyl adipaldate. The methyl adipaldate may be converted to the methyl ω-hydroxy caproate by hydrogenation with a reduced nickel-catalyst at about 3000 p.s.i.g. of CO-free hydrogen pressures for about 6 hours at about 350° F.

The alkyl ω-hydroxy caproates are converted to borate esters (II) by interaction of the former with trialkyl borates especially trimethyl borate. This conversion is accomplished by mixing the ω-hydroxy caproate with at least a molar equivalent of trialkyl borate ester, e.g. trimethyl or triethyl borate and distilling at near atmospheric or reduced pressures to remove alcohol, e.g. methyl or ethyl alcohol, released by the reaction. Where the alcohol forms an azeotrope with the trialkyl borate, as for example in the case of methanol-trimethyl borate, sufficient additional trialkyl borate is used to form this azeotrope. Temperatures of 25 to 175° C., preferably 50–100° C. are used for this conversion.

The resultant borate ester is then subjected to pyrolysis to form caprolactone and regenerate the trialkyl borate. Pyrolysis may be readily effected at temperatures of from about 175 to 300° C., preferably about 200 to 250° C. and under reduced pressure such as about 0.1 to 10 mm. Hg, preferably at about 1 to 5 mm. Hg. From this pyrolysis the overhead is partially condensed to yield a liquid ω-caprolactone stream and a gaseous trialkyl borate stream which is recovered separately by condensation at a lower temperature.

The following examples are illustrative of the present invention.

Example I

A solution of 3.85 g. of methyl ω-hydroxy caproate in 92.66 g. of benzene and 0.28 g. of p-toluene sulfonic acid were heated to reflux. Methanol and some benzene were removed by distillation. After neutralization the remaining light boiling material was stripped off under vacuum to a pot temperature of 45° C. at 4 mm. The yield of nonvolatile material was 3–14 g. of which only 0.18 g. (6% yield of theory) was caprolactone. The remainder of the material was either dimer or polyester. This shows that caprolactone can not be prepared from methyl ω-hydroxy caproate in good yield by conventional procedures.

The following experiment shows, however, that one may prepare caprolactone in good yield by the pyrolysis of the borate ester of methyl ω-hydroxy caproate in accordance with this invention.

Sixty grams of the product,

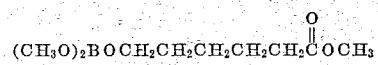

which is prepared by the interaction of trimethyl borate and methyl ω-hydroxy caproate was charged to a 125 ml. distillation flask. The flask was heated under vacuum (approximately one mm. pressure) to 200–230° C. at which point pyrolysis of the borate ester occurred. Trimethyl borate was collected in a Dry Ice-acetone trap as it formed, and simultaneously caprolactone, distilled at a vapor temperature of 90° C., was condensed and collected in a separate trap. The yield of caprolactone was 24 g. (76% of theory). Caprolactone was identified, by its infrared and gas chromatographic spectra. A heavy residue (7.6 g.) remained undistilled. This residue comprised polyester and cyclic dilactone.

*Example II*

5.00 g. of methyl ω-hydroxy caproate was dissolved in dioxane and excess trimethyl borate. The mixture was distilled to remove methanol-TMB azeotrope which was completed in one hour. Excess trimethyl borate and dioxane were distilled to a pot temperature of 31° C. at 0.4 mm. to yield 5.62 g. of residue which was essentially pure borate ester

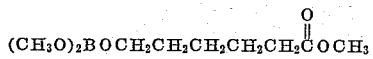

This borate ester was pyrolyzed at 200–300° C. at 0.5 mm. pressure to yield trimethyl borate which was collected in a Dry Ice trap and 1.96 g. of ω-caprolactone (50% of theory based upon methyl ω-hydroxy caproate starting material), which was collected as distillation cuts. The product was identified by IR spectrum and $n_D^{24}$; found 1.4603, reported 1.4608.

*Example III*

The residue from a reaction such as Example I is converted essentially quantitatively to methyl ω-hydroxy caproate by heating in a pressure vessel with 10 volumes of methanol in the presence of 2 wt. percent of p-toluene sulfonic acid monohydrate, at 115° C. for 6 hours.

*Example IV*

The residue from a reaction such as Example I is converted essentially quantitatively to

by heating in a pressure vessel with a large excess of trimethyl borate (i.e. 10 volumes per volume of residue) in the presence of 2 wt. percent of benzene sulfonic acid at 125° C. for 6 hours.

The foregoing description contains a limited number of embodiments of the present invention. It will be understood that this invention is not limited thereto since numerous variations are possible without departing from the scope of the following claims.

What is claimed is:

1. A process for the production of substantially pure caprolactone which comprises converting $C_1$–$C_3$ alkyl ω-hydroxy caproates to borate esters by reaction with at least an equimolar amount of a $C_1$–$C_3$ trialkyl borate at temperatures of from about 25 to 175° C. and heating the resultant diester under vacuum to convert the same to caprolactone and regenerate the trialkyl borate.

2. A process for the production of substantially pure caprolactone which comprises converting $C_1$–$C_3$ alkyl ω-hydroxy caproates to borate esters by reaction with at least an equimolar amount of a $C_1$–$C_3$ trialkyl borate at temperatures of from about 25 to 175° C. and heating the resultant diester to temperatures of from about 175° to 300° C. under reduced pressures of from about 0.1 to 10 mm. Hg to convert the same to caprolactone and regenerate the trialkyl borate.

3. A process for the production of substantially pure caprolactone which comprises converting methyl ω-hydroxy caproate to the methyl borate ester by reaction with at least an equimolar amount of trimethyl borate at temperatures of from about 25° to 175° C. and heating the resultant diester to temperatures of from about 175° C. to 300° C. under reduced pressures of from about 0.1 to 10 mm. Hg to convert the same to caprolactone and regenerate the trimethyl borate.

4. A process for the production of substantially pure caprolactone which comprises converting methyl ω-hydroxy caproate to the methyl borate ester by reaction with at least an equimolar amount of trimethyl borate at temperatures of from about 50° to 100° C. and heating the resultant diester to temperatures of from about 200° to 250° C. under reduced pressures of from about 1.0 to 5.0 mm. Hg to convert the same to caprolactone and regenerate the trimethyl borate.

5. A process for the production of substantially pure caprolactone which comprises converting ethyl ω-hydroxy caproate to the ethyl borate ester by reaction with at least an equimolar amount of triethyl borate at temperatures of from about 25° to 175° C. and heating the resultant diester to temperatures of from about 175° to 300° C. under reduced pressures of from about 0.1 to 10 mm. Hg to convert the same to caprolactone and regenerate the triethyl borate.

6. A process for the production of substantially pure caprolactone which comprises converting ethyl ω-hydroxy caproate to the ethyl borate ester by reaction with at least an equimolar amount of triethyl borate at temperatures of from about 50° to 100° C. and heating the resultant diester to temperatures of from about 200° to 250° C. under reduced pressures of from about 1.0 to 5.0 mm. Hg to convert the same to caprolactone and regenerate the triethyl borate.

References Cited by the Examiner

UNITED STATES PATENTS 2,652,406   9/53   Crabalona _____ 260—343
3,074,965   1/63   Mikusch-Buchberg ___ 260—343.5

FOREIGN PATENTS 655,428   7/51   Great Britain.

OTHER REFERENCES

Carothers: High Polymers, Interscience, New York (1940), pages 235–239.

Gerrard: The Organic Chemistry of Boron, Academic Press, New York (January 1, 1961), page 15.

IRVING MARCUS, *Primary Examiner.*

NICHOLAS S. RIZZO, WALTER A. MODANCE,
*Examiners.*